United States Patent [19]
Harbaugh

[11] Patent Number: 5,417,316
[45] Date of Patent: May 23, 1995

[54] CAPACITIVE VERIFICATION DEVICE FOR A SECURITY THREAD EMBEDDED WITHIN CURRENCY PAPER

[75] Inventor: Steven K. Harbaugh, Castro Valley, Calif.

[73] Assignee: Authentication Technologies, Inc., Dublin, Calif.

[21] Appl. No.: 32,993

[22] Filed: Mar. 18, 1993

[51] Int. Cl.[6] ............................................. G07D 7/00
[52] U.S. Cl. .................................... 194/206; 324/672
[58] Field of Search ................. 194/206, 207; 209/534; 324/672, 679

[56] References Cited
U.S. PATENT DOCUMENTS

| | | |
|---|---|---|
| 3,980,990 | 9/1976 | Berube . |
| 4,524,276 | 6/1985 | Ohtombe . |
| 4,536,709 | 8/1985 | Ishida ............................ 194/206 X |
| 4,652,015 | 3/1987 | Crane . |
| 4,761,205 | 8/1988 | Crane . |
| 4,980,569 | 12/1990 | Crane et al. ........................ 250/556 |
| 5,122,754 | 6/1992 | Gotaas ................................ 194/206 |
| 5,151,607 | 9/1992 | Crane et al. . |

Primary Examiner—F. J. Bartuska
Attorney, Agent, or Firm—Richard H. Kosakowski

[57] ABSTRACT

A verification device for a security thread embedded within currency paper includes two or more sensor channels, each channel comprising a sensor plate and a guard plate disposed adjacent to one another. The sensor plate and guard plate of one channel are in a planar relationship with the sensor plate and guard plate of all other channels. A transistor has its base connected to the sensor plate and its emitter connected to the guard plate, thereby effectively removing any stray capacitance between the sensor and guard plates. The output of the transistor at its emitter is indicative of the amount of the electrical charge on the sensor plate. Signal processing electronics disposed after the transistor convert the sensor plate capacitance into an electrical signal whose pulse width is proportional to the amount of sensor plate capacitance. A valid currency having a security thread embedded therein passes by a sensor plate and varies the amount of capacitance of the plate. The signal processing electronics is responsive to this variation in sensor plate capacitance and provides a signal indicative of the valid security thread.

44 Claims, 2 Drawing Sheets

CAPACITIVE VERIFICATION DEVICE FOR A SECURITY THREAD EMBEDDED WITHIN CURRENCY PAPER

BACKGROUND OF THE INVENTION

This invention relates to currency paper security threads, and more particularly to a capacitive verification device for a security thread embedded within currency paper.

It is known in the art of currency and banknote papers to incorporate a security thread therein. The use of such security threads has increased due to the prevalence of high-resolution, true-color photocopying machines. If modern currency or banknote papers do not have an embedded security thread, the currency can be more easily duplicated with a color photocopier. However, if the security thread is embedded within the paper, it is harder to illicitly reproduce.

The thread may comprise a plastic film having selected aluminum characters formed thereon. The thread is embedded within the currency paper and is not present on either surface of the paper. Such security threads are described in greater detail in U.S. Pat. Nos. 4,652,015 and 4,761,205 to Timothy Crane, both of which are assigned to Crane & Company, Inc.

The security thread described in these patents has printed characters thereon of extreme fine-line clarity and high opacity such that human readability of the printing is possible by means of transmitted light. Yet, the printing remains completely indiscernible under reflected light. To check the authenticity of the thread, the currency is placed under an intense light source and the characters observed by the human eye. However, in commercial situations where such an intense light source is unavailable, thus making a human check for thread presence and authenticity virtually impossible, it is desirable to provide means for automatically determining the thread's presence and authenticity. Various known means for providing verification of the presence and authenticity of the aforementioned security thread are exemplified in U.S. Pat. Nos. 4,980,569 and 5,151,607.

In contrast to the aforementioned security thread having selected metallized characters formed thereon, it is known in the art to use a "solid" security thread. Such thread comprises a polyester substrate having a metal, such as aluminum, vacuum deposited entirely on the polyester substrate to a thickness of, e.g., 100–300 angstroms. Such "solid" threads sometimes have indicia printed thereon indicative of, e.g., currency denomination. However, normally the printing cannot be seen even under an intense light source; therefore, such printing is often times eliminated.

The "solid" thread is normally disposed within the currency in the same manner as the aforementioned selectively metallized threads. That is, the thread extends from top to bottom and transversely across the linear extent of the currency. It is known to use such "solid" security threads within the currency of, e.g., Saudi Arabia. It is also known to sometimes combine the metallization of the "solid" security thread with magnetic material, e.g., iron oxide. The magnetic material may be indicative of currency denomination.

The aforementioned security thread verification devices described and claimed in U.S. Pat. Nos. 4,980,569 ('569) and 5,151,607 ('607) may be used to detect the presence and authenticity of a security thread embedded within currency. The '569 patent discloses a verification device comprising two optical light source/detector pairs disposed on opposite sides of a proffered currency. The source and detector pairs are arranged for transmission and reception of optical energy through the currency if the thread is not present. Also, the source and detector pairs can determine the presence of a counterfeit thread on the currency surface by checking for light reflected off the currency surface. Thus, the '569 patent provides a twofold test wherein the thread, to be genuine, must be detected under transmitted light and not be detected under reflected light. However, the device in the '569 patent may give a false indication of the authenticity of a counterfeit currency when a pencil line is drawn on the currency surface at the normal thread location.

In an attempt to overcome the shortcomings of the '569 patent, the '607 patent discloses a verification device comprising the optical means of the '569 patent in combination with a magnetic detector, magnetic reader, or non-ferrous metal detector. The latter detectors determine the presence of the security thread, while the optical means determines whether the thread is properly within the currency or improperly disposed on either surface. However, heretofore, no known device which effectively verifies the presence and authenticity of the aforementioned "solid" security thread has been provided.

Accordingly, it is a primary object of the present invention to provide an improved security thread detector.

It is a general object to provide a detector that can determine the authenticity of currency at a rapid rate.

It is yet another object to provide a detector that can verify the presence of a security thread embedded within currency paper through use of a capacitive plate and circuitry which senses the change in the amount of charge on the plate caused by a security thread passing in proximity to the plate.

The above and other objects and advantages of this invention will become more readily apparent when the following description is read in conjunction with the accompanying drawings.

SUMMARY OF THE INVENTION

To overcome the deficiencies of the prior art and to achieve the objects listed above, Applicant has invented a verification device for security threads embedded within currency paper, the device incorporating a capacitive plate and means for sensing a change in the amount of electrical charge on the plate, such change in the amount of charge caused by a security thread embedded within currency paper passing in proximity to the capacitive plate.

In the preferred embodiment, the invention comprises two or more security thread sensor channels disposed in adjacent relationship to one another, each sensor channel comprising a sensor element having an electrical voltage applied thereto and a guard element disposed next to the sensor element. The sensor and guard comprise electrically-conductive plates disposed on a top surface of a multi-layer printed circuit ("PC") board. A second guard plate is disposed within the middle layer of the PC board and underneath both the upper guard and sensor plates; both guard plates being used to reduce any stray capacitance near the sensor plate. The top surface of the sensor and guard plates of one channel are disposed in a planar orientation with the corresponding top surfaces of the sensor and guard plates of all other channels. As a currency paper having the aforementioned "solid" security thread embedded therein passes by the sensor plate, the dielectric constant of the paper changes significantly in the vicinity of the thread. Such change in the dielectric constant changes the amount of charge on the sensor plate; that is, the thread conducts charge off of the sensor plate even though the thread is not in electrical continuity with the sensor plate. The thread thus effectively increases the area of the capacitive sensing plate, thereby changing the capacitance of the plate. Further, a reference element comprising an electrically conductive plate is disposed on the top surface of the PC board adjacent the guard. The reference plate makes it easier for the thread to draw off charge from the sensor plate. A transistor has its base connected to the sensor plate and its emitter connected to the guard plate, thereby effectively removing any stray capacitance between the sensor and guard. The transistor is disposed in close proximity to the sensor. Signal processing electronics, located remotely from the sensor channel on a separate PC board, convert the capacitance on the sensor plate into an electrical signal having a pulse width that is proportional to the sensor plate capacitance. The electrical signal is processed to provide indication of the presence or absence of the thread from within the proffered currency.

DETAILED DESCRIPTION OF THE PREFERRED EMBODIMENTS

Figure 1:
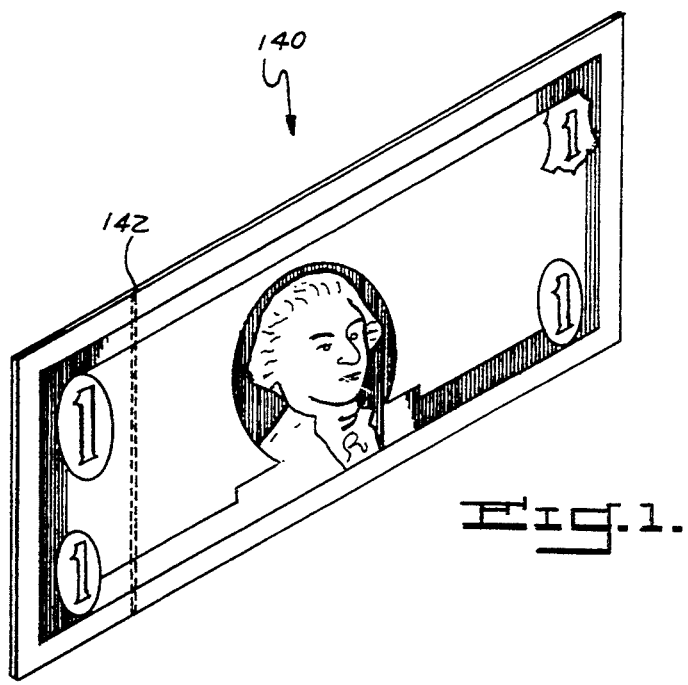
FIG. 1 is a perspective view of currency paper of, e.g., Saudi Arabia, having a metallized security thread embedded therein.

Referring to the drawings in detail, a preferred embodiment of a capacitive verification device for a security thread embedded within currency paper is shown and generally designated by the reference numeral 100. The verification device 100 of the present invention basically comprises two or more sensor channels 102, 104 (two channels 102, 104 in the preferred embodiment described hereinafter), each channel 102, 104 comprising a sensor plate 106, 108, having an electrical voltage applied thereto, and a guard plate 110, 112, the sensor and guard plates being disposed adjacent to one another. The sensor and guard plates comprise electrically-conductive plates disposed on a top surface of a multi-layer PC board 114. A second guard plate 115 is disposed within the middle layer of the PC board and underneath both the upper guard and sensor plates; both guard plates being used to reduce any stray capacitance near the sensor plate. Further, a reference plate is disposed on the top surface of the PC board 114 adjacent the guard plates. The sensor plate 106 and guard plate 110 of one channel 102 are in a planar relationship with the sensor plate 108 and guard plate 112 of all other channels 104, and with the reference plate. A transistor 116, 118 for each channel has its base 120, 122 connected to the sensor plate 106, 108 and its emitter 124, 126 connected to the guard plate 110, 112, thereby effectively removing any stray capacitance between the sensor and guard plates. The transistor is disposed in close proximity to the sensor plate. The magnitude of the voltage output of the transistor at its emitter is indicative of the amount of the electrical charge on the sensor plate. Signal processing electronics disposed after the transistor convert the sensor plate charge or capacitance into an electrical signal whose pulse width is proportional to the amount of sensor plate capacitance. The electrical signal is processed to provide indication of the presence or absence of the thread from within the proffered currency. As a currency paper 140 having a security thread 142 embedded therein passes by the sensor plate, the dielectric constant of the paper 140 changes significantly in the vicinity of the thread 142. Such changes in the dielectric constant changes the amount of charge on the sensor plate 106, 108; that is, the thread conducts charge off of the sensor plate even though the thread is not in electrical continuity with the sensor plate. The thread thus effectively increases the area of the capacitive sensing plate, thereby changing the capacitance of the plate.

Referring to FIG. 1, there illustrated is an example of currency or bank note paper 140 of, e.g., Saudi Arabia. The currency 140 includes a security thread 142 (illustrated in phantom) embedded entirely within the paper 140, and not disposed on any surface of the paper. The thread 142 may be of the well-known "solid" type described hereinbefore. The thread 142 extends from top to bottom and transversely across the linear extent of the currency 140. The thread 142 comprises a polyester or plastic substrate completely covered by a metal, such as aluminum, that is vacuum deposited thereon to a thickness of, e.g., 100–300 angstroms. The thread 142 is opaque to transmitted light, thus readily apparent when exposed to an intense light source. Yet, the thread 142, being embedded within the currency paper 140 and not on any surface thereof, does not reflect light.

Figure 2:
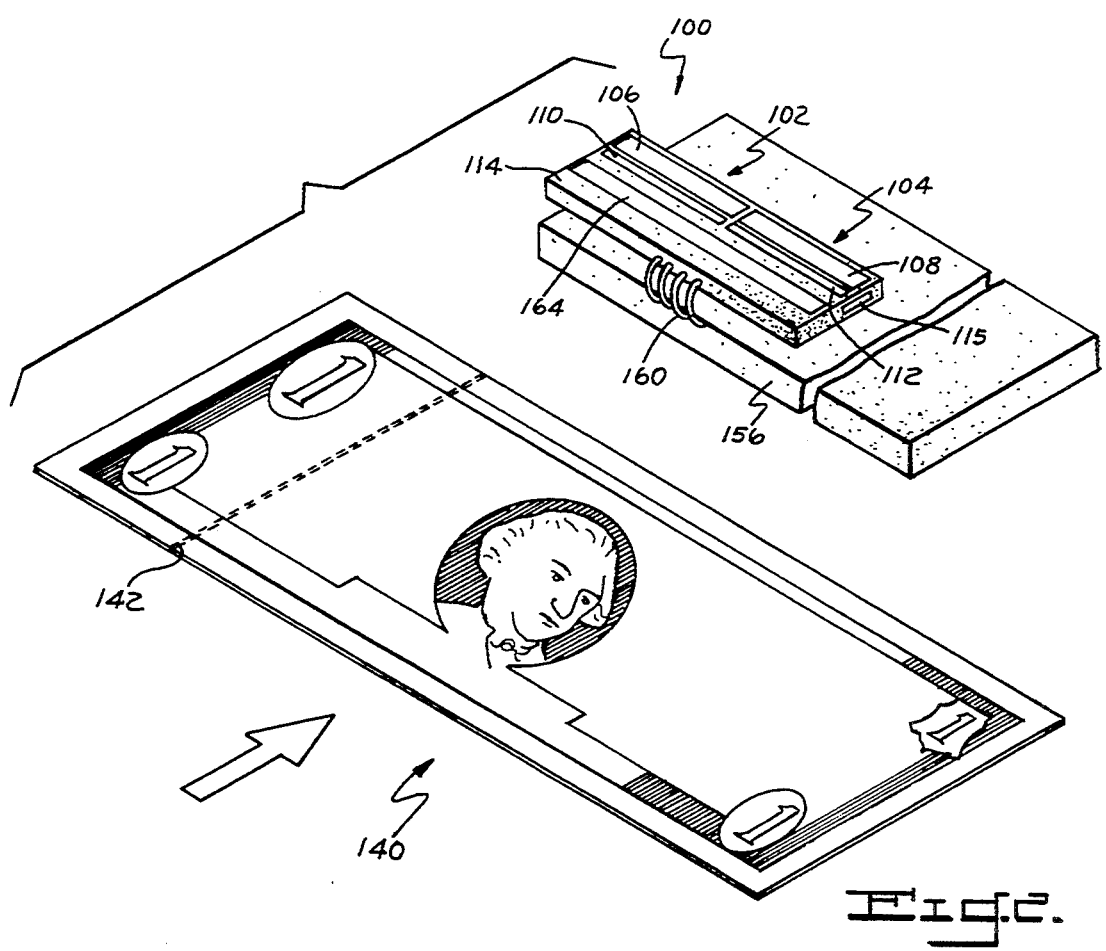
FIG. 2 is a perspective view of a security thread verification device in accordance with the present invention for receiving the currency of FIG. 1.
Figure 3:
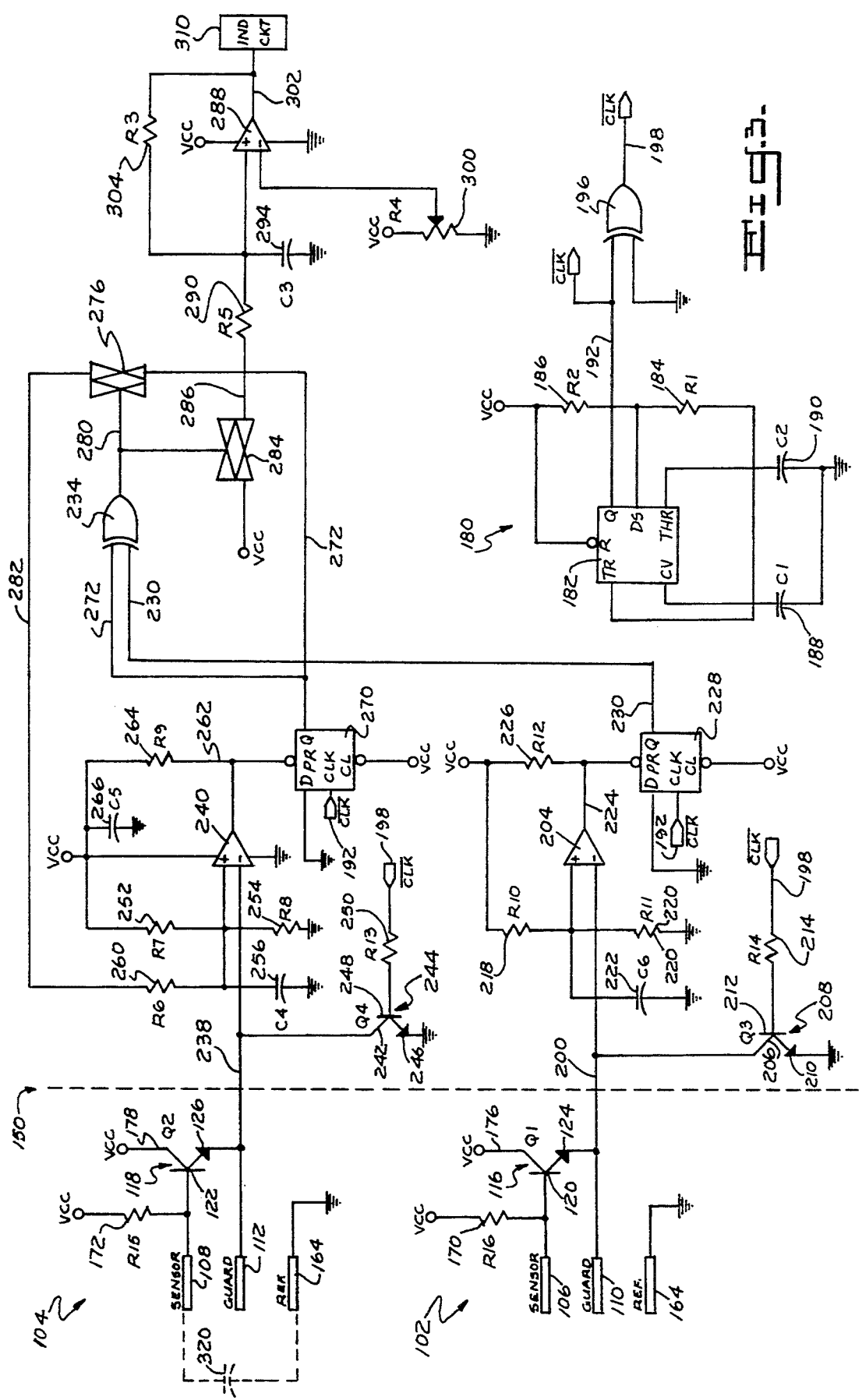
FIG. 3 is a schematic diagram of electronic circuitry included within the verification device of FIG. 2.

Referring to FIGS. 2 and 3, there illustrated is a capacitive security thread verification device 100 of the present invention. The device 100 comprises two sensor channels 102, 104 and associated electronic circuitry 150. The sensing portion of each sensor channel, together with associated preamplifier circuitry (illustrated to the left of the vertical dashed line in FIG. 3), is disposed on a multi-layer printed circuit ("PC") board 114, while the remainder of the signal processing circuitry 150 (illustrated to the right of the vertical dashed line in FIG. 3) is disposed on a remote PC board 156. The multi-layer PC board 114 may be connected to the remote PC board 156 by way of, e.g., a ribbon cable electrical connector 160. Disposed on a top layer of the multi-layer PC board 114 for each sensor channel 102, 104 is the electrically-conductive sensor plate 106, 108. Disposed adjacent to the sensor plate is a guard plate 110, 112. Also, a single reference plate electrode 164 may be disposed on the top layer of the PC board 114 adjacent to the guard plate 110, 112 of each sensor channel 102, 104. In the middle layer of the PC board 152 is disposed a second guard plate 115, located directly beneath the corresponding upper guard plate 110, 112 and sensor plate 106, 108 of the corresponding channel 102, 104. The guard plate 115 in the middle layer of the PC board 114 is electrically connected to the guard plates 110, 112 on the top surface of the PC board 114. Although not visible, the bottom layer of the multi-layer PC board 152 contains circuit traces, pads, and surface-mounted electronic components for signal processing.

Referring to FIG. 3, there illustrated is circuitry 150 disposed on both the multi-layer PC board 114 and the remote PC board 156. The sensor plate 106, 108 of each channel 102, 104 of the two channel device 100 illustrated in FIG. 2 is connected to the base 120, 122 of a corresponding pre-amp transistor, Q1 and Q2 116, 118. Each base is connected to a positive voltage supply, $V_{CC}$ (for example, +5 V) through a corresponding current-limiting resistor 170, 172. A collector terminal 176, 178 of each transistor Q1 and Q2 116, 118 is also connected to $V_{CC}$, while the emitter 124, 126 of each transistor Q1 and Q2 116, 118 is connected to the corresponding guard plate 110, 112. The current-limiting resistors 170, 172 and pre-amp transistors Q1 and Q2 116, 118 are disposed on the bottom layer of the multi-layer PC board 114. Each pre-amp transistor Q1 and Q2 116, 118 may comprise the Model MMBTH10LT1, provided by Motorola, Inc. of Phoenix, Ariz. The remainder of the circuitry 150 illustrated in FIG. 3 to the right of the dashed line is located remote from the multi-layer PC board 114 and may, for illustrative purposes, be located on the remote PC board 156.

An oscillator 180 generates a clock signal having a free running frequency of approximately 1 megahertz ("Mhz"). The oscillator comprises a timer integrated circuit ("IC") 182 and associated components. The timer 182 may comprise the Model TLC556CN, provided by Texas Instruments, Inc. of Dallas, Tex. A pair of resistors 184, 186 and a pair of capacitors 188, 190 connect to the timer IC 182 and set the frequency of the output signal ("CLK") of the timer IC on a signal line 192. The oscillator output signal on the line 192, which is in the form of a square wave signal, is fed to one input of an exclusive-OR gate 196, which may comprise the Model 74HC86, provided by Motorola, Inc. of Phoenix, Ariz. The exclusive-OR gate 196 inverts the oscillator output signal and provides a corresponding inverted oscillator signal ("/CLK") on a signal line 198.

The output of one of the pre-amp transistors Q1 116 at its emitter terminal 124 is fed on a signal line 200 to an inverting input of a comparator 204, which may comprise the Model TLC374, provided by National Semiconductor Corp. of Austin, Tex. The output signal on the line 200 of pre-amp transistor Q1 116 is indicative of the amount of electrical charge on the corresponding sensor plate 106. Also connected to the inverting input of the comparator 204 is a collector 206 of a transistor Q3 208, which may comprise the Model 2N5772, provided by Motorola, Inc. of Phoenix, Ariz. An emitter 210 of transistor Q3 208 is connected to ground, while a base 212 of transistor Q3 208 is connected through a resistor 214 to the inverted oscillator signal on the line 198.

Applied to the non-inverting input of the comparator 204 is a threshold voltage, the value of which is determined by a pair of resistors, R10 218 and R11 220. A capacitor 222 also connects between the non-inverting input and ground. The output of the comparator 204 on the signal line 224 is pulled up to $V_{CC}$ through a resistor 226. The comparator output on the line 224 is also fed to the active-low preset input of a flip-flop 228, which may comprise the Model 74HC74, provided by Texas Instruments, Inc. of Dallas, Tex. The flip-flop 228 is clocked by the oscillator output signal on the line 192. The Q output signal of the flip-flop 228 is provided on a line 230 to one input of a second exclusive-OR gate 234.

This Q output signal is representative of the output of one channel 102 of the two channel verification device 100 of the exemplary embodiment of the present invention.

The emitter terminal 126 of a second pre-amp transistor Q2 118 is connected on a signal line 238 to an inverting input of a second comparator 240, which may also comprise the Model TLC374. Also connected to the inverting input is a collector 242 of a transistor Q4 244, which, similarly to Q3, may also be the Model 2N5772. An emitter 246 of transistor Q4 244 is connected to ground, while a base 248 is connected through a resistor 250 to the inverted oscillator output signal on the line 198. In a similar manner to the first comparator 204, the non-inverting input of the second comparator 240 has applied thereto a threshold voltage whose value is determined in part by a pair of resistors, R7 and R8 252, 254. Also connected to the non-inverting input is a capacitor 256. However, contrary to the first comparator, the value of the threshold voltage applied to the non-inverting input of the second comparator 240 is further determined by a variable voltage applied to the non-inverting input through a resistor, R6 260. This variable voltage threshold is described in detail hereinafter.

The output of the second comparator 240 on a signal line 262 is pulled up to $V_{CC}$ through a resistor 264. A capacitor 266 connects between $V_{CC}$ and ground at the voltage supply terminal of the second comparator 240. The first and second comparators 204, 240 may reside within the same IC. The output of the second comparator on the line 262 is connected to an active-low preset input of a second flip-flop 270, which may also comprise the Model 74HC74. The second flip-flop 270 is also clocked by the oscillator output signal on the line 192.

The Q output of the second flip-flop connects on a signal line 272 to a second input of the second exclusive-OR gate 234. The Q output of the second flip-flop is also fed to an input of a first analog switch 276. The output of the second exclusive-OR gate 234 on a signal line 280 is fed to a control input of the first analog switch 276. The output of the first analog switch 276 is fed on a line 282 to one end of the resistor R6 260 that sets the variable threshold voltage for the second comparator 240. The output of the second exclusive-OR gate 234 on the line 280 is also fed to a control input of a second analog switch 284. The first and second analog switches 276, 284 may reside within a single IC which may comprise the Model 4066, provided by Motorola, Inc. of Phoenix, Ariz. The input to the second analog switch 284 is the positive voltage supply, $V_{CC}$.

The output of the second analog switch 284 on a signal line 286 is fed to a non-inverting input of a third comparator 288 through a resistor 290. The third comparator 288 may comprise the Model LM324, provided by National Semiconductor Corp. of Austin, Tex. A capacitor 294 also connects to the non-inverting input of the third comparator 288. A threshold voltage is applied to the inverting input of the third comparator 288 through a variable resistor 300. The output of third comparator on a line 302 connects back to the non-inverting input through a resistor 304. The output of the third comparator 288 also connects to an indicator circuit 310 comprising, e.g., light emitting diodes ("LEDs"). In the circuitry 150 of FIG. 3, any suitable resistors, variable resistor and capacitors will suffice. Typical resistors include those manufactured and sold by Allen-Bradley Company, of Milwaukee, Wis. Typical capacitors may be those manufactured and sold by Sprague Electric Co., of Mansfield, Mass. In the preferred embodiment of the verification device 100 of the present invention, the following resistor and capacitor values are utilized in the circuitry of FIG. 3.

| Reference No. | Resistor/ Capacitor No. | Resistance/ Capacitance |
|---|---|---|
| 184 | R1 | 200 ohms |
| 186 | R2 | 1K ohms |
| 304 | R3 | 1 Meg. ohms |
| 300 | R4 | 10K ohms |
| 290 | R5 | 10K ohms |
| 260 | R6 | 100K ohms |
| 252 | R7 | 470K ohms |
| 254 | R8 | 470K ohms |
| 264 | R9 | 10K ohms |
| 218 | R10 | 470K ohms |
| 220 | R11 | 470K ohms |
| 226 | R12 | 10K ohms |
| 250 | R13 | 10K ohms |
| 214 | R14 | 10K ohms |
| 172 | R15 | 470K ohms |
| 170 | R16 | 470K ohms |
| 188 | C1 | 0.100 Microfarads |
| 190 | C2 | 0.003 Microfarads |
| 294 | C3 | 0.033 Microfarads |
| 256 | C4 | 10 Microfarads |
| 266 | C5 | 0.100 Microfarads |
| 222 | C6 | 0.100 Microfarads |

The operation of the security thread verification device 100 of the present invention is best understood by example. The sensor plate 106, 108 of each channel 102, 104 of the two-channel device 100 comprises a capacitor plate having an electrical charge provided thereon by the positive voltage supply, $V_{CC}$. As the currency 140 of FIG. 1 passes in proximity to a sensor plate 106, 108, as indicated by the directional arrow in FIG. 2, any change in the amount of electrical charge on the capacitor plate 106, 108 is due to a change in the dielectric constant within the currency paper 140. Such change in the dielectric constant of the paper occurs in the presence of the metallized security thread 142 embedded within the currency paper 140. Thus, the metallized security thread 142 has physical properties (e.g., dielectric constant) that differ from those of the paper. The present invention detects these differences, which allows for detection of the presence or absence of the thread 142. Then, once the thread 142 is detected, the authenticity of the currency 140 is verified.

On the rising edge of the oscillator output signal on the line 192, the Q output of each flip-flop 228, 270 is reset to a logic zero. This is because the data "D" input of each flip-flop 228, 270 is connected to ground. At the same time, both transistors, Q3 and Q4 208, 244, are turned off by the corresponding falling edge of the inverted oscillator output signal on the line 198. This allows the voltage at each of the corresponding transistor collector terminals 206, 242 to "float". The voltage at each collector terminal 206, 242 increases at a rate that is determined by the base circuit of each of the corresponding pre-amp transistors, Q1 and Q2 116, 118. The time constant of each base circuit is a function of the capacitance value of the corresponding sensor plate 106, 108 together with the effective input impedance of each of the associated pre-amp transistors, Q1 and Q2 116, 118.

For the first channel 102 of the two channel device 100 illustrated in FIGS. 2 and 3, when the collector voltage of transistor Q3 208 reaches the threshold voltage determined by the pair of resistors R10 and R11 218, 220, the output of the first comparator toggles to a logic zero state. This logic zero output presets the first flip-flop 228 to a logic one state at its Q output on the signal line 230. Thus, it can be seen from the foregoing that the length of time that the Q output of the first flip-flop 228 on the line 230 is at a logic zero (i.e., the "pulse width") is indicative of the amount of electrical charge present on the sensor plate 106. Transistor Q3 is then turned on during the rising edge of the inverted oscillator output signal on the line 198, thereby switching the voltage at the collector terminal 206 of transistor Q3 208 to ground and discharging any sensor plate capacitance through the base 120 of the pre-amp transistor Q1 116.

At the same time, during the falling edge of the oscillator output signal on the line 192, the first flip-flop 228 is unaffected (i.e., its outputs remain in the state just prior to the falling edge). Then, after a predetermined length of time long enough to allow the sensor plate capacitance to discharge, the oscillator output signal on the line 192 assumes a rising edge and, concurrently, the inverted oscillator output signal on the line 198 assumes a falling edge, thereby starting the aforementioned cycle all over again.

It can also be seen from the foregoing that when transistor Q3 208 is turned off, allowing the collector terminal 206 to "float", pre-amp transistor Q1 116 is functioning as an amplifier. The output current of pre-amp transistor Q1 116 is the "Beta" (i.e., current gain) of the transistor multiplied by the base current. The base current is limited by the value of resistor R16 170. On the other hand, when transistor Q3 208 is turned on, thereby switching electrical ground to its collector terminal 206, pre-amp transistor Q1 116 functions to discharge the capacitance on the sensor plate 106 by providing a path to ground for the charge accumulated on the sensor plate.

The second channel 104 of the two-channel device, illustrated in FIGS. 2 and 3, is identical in structure and operation to the first channel 102 with one exception. That is, on the rising edge of the oscillator output signal on the line 192, the Q output of the second flip-flop 270 on the line 272 is reset to a logic zero, similar to the first flip-flop 228. At the same time, transistor Q4 is turned off allowing its collector voltage to "float". The voltage applied to the inverting input of the second comparator 240 increases at a rate that is determined by the time constant of the base circuit of pre-amp transistor Q2 118. The time constant is a function of the amount of capacitance on the sensor plate 108 and the effective input impedance of pre-amp transistor Q2 118. When the collector voltage of transistor Q4 244 reaches the threshold voltage determined by the variable threshold circuitry of the second comparator 270, the output of the second comparator 240 on the line 262 switches to a logic zero, presetting the Q output of the second flip-flop 270 to a logic one state.

The difference between two channels 102, 104 is that the threshold voltage of the second comparator 240 is not fixed, but rather is determined by the output of the first analog switch 276. The Q output signals from both flip-flops 228, 270 are input to the second exclusive-OR gate 234. This gate 234 produces a logic one output whenever the input states are not identical. Thus, a logic one at the output of the second exclusive-OR gate 234 indicates an error condition whenever the pulse widths of the signals of the two flip-flops 228, 270 are not identical. This error signal is fed at the output of the second exclusive-OR gate 234 to control the first analog switch 276 in order to develop a compensating threshold voltage signal for the non-inverting input of the second comparator 240. The variable threshold has the effect of changing the pulse width of the Q output of the second flip-flop 270 in a direction to reduce or cancel the error signal at the output of the second exclusive-OR gate 234.

Through use of this dynamic threshold circuity, the second comparator 240 (and, thus, the second flip-flop 270) is forced to maintain a pulse width equal to that of the first comparator 204 (and first flip-flop 228) over a time interval determined by R6 260 and C4 256. With the two channels 102, 104 operating in balance, any simultaneous capacitance change, equal in magnitude, on the sensor plates 106, 108 of both channels will not result in an error signal at the output of the second exclusive-OR gate 234. Such simultaneous capacitance change of equal magnitude may be produced by a currency paper 140 having no security thread 142 embedded therein, i.e., a counterfeit thread. Such change may also be produced by a currency paper 140 having a security thread 142; however, either the thread 142 is simultaneously covering both sensor plates 106, 108 or the thread 142 simultaneously covers neither sensor plate 106, 108.

On the other hand, the proximity of the security thread 142 altering the sensor plate capacitance of only one channel will produce an error signal at the output of the second exclusive-OR gate 234 that is further detectable. Note that even with a thread 142 altering the capacitance of a single channel, the variable threshold circuitry of the second comparator 240 will operate to have the output of the second comparator 240 and corresponding flip-flop 270 equal that of the first comparator 204 and associated flip-flop 228. However, during the finite amount of time that such equalization occurs, the error signal on the line 280 is further detectable and indicative of the presence of a security thread 142. This error signal output is fed on the line 280 to control the second analog switch 284, which applies, in response thereto, the positive supply voltage to one side of resistor R5 290. This, in turn, charges capacitor C3 294 to a voltage that is applied to the non-inverting input of the third comparator 288. An adjustable threshold voltage, set by the variable resistor R4 300, is applied to the inverting input of the third comparator 288. The adjustable threshold voltage is set high enough so that small differences in sensor plate capacitances caused by, e.g., stray capacitance or tolerances in electronic components within the circuitry 150, do not cause an indication of the presence of a security thread 142 within a proffered currency 140. When the error-induced charge voltage on capacitor C3 294 exceeds the threshold voltage, then the output of the third comparator 288 toggles to a logic one, thereby indicating the presence of the security thread 142. Such presence of the security thread may then be indicated visually by the indicator circuit 310.

The security thread verification device of the present invention has been described and illustrated herein as comprising two sensor channels 102, 104 disposed adjacent to one another. However, it is to be understood that more than two, for example, four channels may be utilized in light of the teachings herein. Similar to the two channel embodiment described herein, the four channel embodiment may have all of the sensor and guard plates of each channel disposed in the planar arrangement on one side of a proffered currency paper 140. Further, if desired, two or more channels, similar to those described herein, may be disposed on an opposite side of a proffered currency. In such arrangement, security thread verification devices in accordance with the present invention may then be disposed on both sides of a proffered currency paper. Regardless of the amount of channels eventually utilized, the electronic circuitry needed to process any change in sensor plate capacitance should be apparent to one of ordinary skill in the art in light of the teachings therein.

The Applicant envisions using the security thread verification device 100 of the present invention in such devices as, e.g., vending machines, money counting-/sorting equipment, a cash receiver (e.g., cash register), automated authentication equipment, or automatic teller machines. In such exemplary applications of the present invention, the proffered currency 140 may pass by the verification device 100 of the present invention in an automatic fashion. Such automatic passage is usually accomplished by means of a mechanical transport. However, it is to be understood that such means of transporting a proffered currency in proximity to the verification device of the present invention is not a part of the broadest scope of the present invention.

The security thread verification device of the present invention 100 has been described herein for use with a currency or banknote paper 140 having a security thread 142 embedded therein. However, the present invention is not limited to detecting threads in currency; the invention may be used to detect a thread present in other documents as well, such as stock certificates or bonds. Further, the present invention has been described for use in verifying the presence of a "solid" security thread 142 described hereinbefore. However, the present invention is not limited as such; it may be used with other types of security threads having sufficient amounts of metallization to effect a detectable change in the dielectric constant of the paper in which the thread is embedded. For example, the present invention may be used with the known "reverse image" (a.k.a. "clear text") types of security threads.

In FIG. 2, the proffered currency paper 140 has been illustrated as being directed over the sensor plates 106, 108 of the verification device in a particular orientation. However, it is to be understood that such orientation of the thread with respect to the plate is purely exemplary. That is, the thread may be at some angular orientation to the long dimension of the sensor plate. In sum, the verification device of the present invention is not dependent on the geometry of the thread. Any change in the capacitance of the sensor plate is due only to the presence of the thread. Further, the present invention may be used with security threads being metallized as described herein, but also including additional magnetic material (e.g., iron oxide) disposed thereon, the magnetic material being indicative of e.g., currency denomination.

Further, the method described herein for converting a change in the sensor plate capacitance to a detectable signal is purely exemplary. That is, the fact that the change in sensor plate capacitance is indicated by a change in the pulse width of an electronic signal is irrelevant to the broadest scope of the present invention. It suffices that some means be provided for providing an electrical signal having some characteristic indicative of the amount of change in sensor capacitance.

Still further, the present invention has been described as having two or more sensing channels. However, it is to be understood that the present invention is not limited as such. That is, the present invention may be used with a single sensing channel, for example, channel 102 of FIG. 3. For proper operation of such a single channel embodiment, a reference signal indicative of a fixed amount of capacitance may be used as a comparison for the sense signal provided by the single channel.

For example, the second channel of FIG. 3 may have a fixed capacitor 320, shown in phantom, connected across the sensor plate 108 and reference plate 164. The value of the capacitor 320 is approximately equal to that of the paper of the currency to be sampled, approximately 0.1 pf. In the alternative, the sensor 108, guard 112 and reference plates 164 may be eliminated entirely and the capacitor 320 connected between the base 122 and emitter 126 of the pre-amp transistor Q2 118.

The portion of the circuitry 150 following the pre-amp transistor Q2 118 may provide a reference signal on the line 272 to the second exclusive-OR gate 234 to be compared with the signal on the line 230 indicative of the actual amount of charge on the sensor plate 106 of the single channel embodiment. Then, any difference between the signals is indicative of the presence of the security thread in the currency. It is to be understood that other circuitry besides that shown in FIG. 3 may be used to generate a reference signal 272, in light of the teachings herein.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A device for verifying the authenticity of a document, an authentic document having a security thread embedded within the document paper and not present on any surface of the paper, at least a portion of the thread being made up of metallic material, the verification device comprising:
   a. two or more sensing channels, each channel disposed in spaced relationship to all other channels such that a valid security thread within an authentic document has an effect on only one channel at any one time, each channel including sensing means for storing a quantity of electrical charge and for providing a charge signal indicative of the actual amount of electrical charge stored by the sensing means, each channel also including corresponding signal processing means, responsive to the charge signal, for providing a sense signal having a characteristic indicative of the actual amount of charge stored by the sensing means; and
   b. means, for comparing each of the sense signals from the corresponding signal processing means with one another to determine any difference between the characteristics of the sense signals indicative of the actual amount of electrical charge stored by each of the sensing means, and for providing a difference signal indicative of the result of the comparison.

2. The verification device of claim 1, further comprising indicating means, responsive to the difference signal, for providing an indication of any difference in the characteristics in the sense signals indicative of the actual amount of electrical charge stored by each of the sensing means as a result of the comparison.

3. The verification device of claim 1, wherein each of the two or more sensing channels further comprises first guard means, disposed adjacent to the corresponding sensing means, for reducing any stray capacitance in the vicinity of the corresponding sensing means.

4. The verification device of claim 3, wherein each of the two or more sensing channels further comprises means for reducing any stray capacitance between the sensing means and the first guard means.

5. The verification device of claim 4, wherein said means for reducing stray capacitance comprises a transistor, having a base terminal connected to the sensing means, and having an emitter terminal connected to the first guard means.

6. The verification device of claim 5, wherein the transistor comprises voltage means for providing the charge signal as a signal having an electrical voltage characteristic that increases in magnitude as a function of the input impedance of the transistor multiplied by the charge accumulated on the sensing means.

7. The verification device of claim 1, where, for each of the sensing channels, the corresponding sensing means is located physically remote from the corresponding signal processing means so as to reduce any stray capacitance that may affect the sensing means.

8. The verification device of claim 1, wherein the sensing means of each sensing channel is disposed on a first printed circuit board and the corresponding signal processing means of each sensing channel is disposed on a second printed circuit board that is located physically apart from the first printed circuit board.

9. The verification device of claim 8, wherein each of the two or more sensing channels further comprises first guard means, disposed adjacent to the corresponding sensing means, for reducing any stray capacitance in the vicinity of the corresponding sensing means.

10. The verification device of claim 9, wherein the first printed circuit board further comprises second guard means, electrically connected to the first guard means and disposed within the first printed circuit board below both the sensing means and the first guard means, for reducing any stray capacitance in the vicinity of the corresponding sensing means.

11. The verification device of claim 1, wherein each of the sensing means comprises an electrically-conductive plate having a planar top surface, the planar surfaces of a selected number of the sensing means being disposed in a planar relationship to one another.

12. The verification device of claim 3, wherein each of both the sensing means and the first guard means comprises an electrically-conductive plate having a planar top surface, the planar surface of a selected member of the sensing means and first guard means being disposed in a planar relationship to one another.

13. The verification device of claim 12, further comprising an electrically conductive reference plate having a planar top surface connected to an electrical reference potential, and disposed adjacent to the first guard means of each of the sensing channels, the planar top surface of the reference plate being disposed in a planar relationship to the planar surfaces of the selected number of the sensing means and first guard means.

14. The verification device of claim 1, wherein the signal processing means of each sensing channel further comprises:

a. comparator means, for comparing the charge signal with a threshold signal, the threshold signal having a predetermined value indicative of a desired amount of charge, and for providing a binary value signal having a first value indicative of a condition when the actual amount of charge stored by the sensing means as indicated by the charge signal is less than the desired amount of charge indicated by the threshold signal, the binary value signal having a second value indicative of the condition when the actual amount of charge stored by the sensing means as indicated by the charge signal is greater than the desired amount of charge indicated by the threshold signal; and b. bistable means, responsive to the binary value signal, for providing the sense signal as a signal having two logic states, a first logic state indicative of the condition when the actual amount of charge stored by the sensing means is less than the desired amount of charge, a second logic state indicative of the condition when the actual amount of charge stored by the sensing means is greater than the desired amount of charge.

15. The verification device of claim 14, wherein the characteristic of the sense signal indicative of the actual amount of charge on the sensing means is an amount of time that the sense signal is at the first logic state of the bistable means.

16. The verification device of claim 1, wherein the charge signal has a value indicative of a corresponding finite amount of charge stored on the sensing means during a first predetermined time period; and wherein each sensing channel further comprises discharge means, for reducing to zero the actual amount of charge stored by the corresponding sensing means during a second predetermined time period beginning after the end of the first predetermined time period, the charge signal having a corresponding value indicative of the reduction of the actual amount of charge stored by the corresponding sensing means during the second predetermined time period.

17. The verification device of claim 16, further comprising oscillator means, for providing a repetitive time-varying signal having binary logic states, for triggering the signal processing means of each sensing channel to provide the associated sense signal with the corresponding characteristic during the first predetermined time period, and for triggering the discharge means of each sensing channel to reduce to zero the actual amount of charge stored by the sensing means during the second predetermined time period.

18. The verification device of claim 1, further comprising amplifier means, responsive to the difference signal, having a first input to which a threshold voltage is applied, and having a second input to which is applied a voltage indicative of an amount of time that the value of the difference signal is indicative of any difference in the characteristics of the sense signals as a result of the comparison, for providing a thread signal indicative of the presence of the security thread within the document paper when the voltage applied to the second input of the amplifier means exceeds the threshold voltage applied to the first input of the amplifier means.

19. The verification device of claim 14, wherein the threshold signal operable on by the comparator means of one of the sensing channels has a variable voltage value indicative of the desired amount of charge, and wherein the threshold signal operable on by the comparator means of each of the other sensing channels has a fixed voltage value indicative of the desired amount of charge.

20. The verification device of claim 19, further comprising switch means, responsive to the difference signal, for combining: 1) the sense signal from the bistable means corresponding to the comparator means having a threshold signal with the variable voltage value; with 2) the threshold signal having a variable voltage value, in response to the difference signal being indicative of a difference between the characteristics of the sensed signals, so as to vary the voltage value of the variable voltage value threshold signal in a manner to reduce any difference between the characteristics of the sense signals.

21. A device for verifying the authenticity of a document, an authentic document having a security thread embedded within the document paper and not present on any surface of the paper, at least a portion of the thread being made up of metallic material, the verification device comprising:

a. sensing means for storing a quantity of electrical charge and for providing a charge signal indicative of the actual amount of electrical charge stored by the sensing means;

b. signal processing means, responsive to the charge signal, for providing a sense signal having a characteristic indicative of the actual amount of charge stored by the sensing means;

c. reference means for providing a reference signal indicative of a predetermined amount of electrical charge; and d. means, for comparing the sense signal to the reference signal to determine any difference therebetween, and for providing a difference signal indicative of the result of the comparison.

22. The verification device of claim 21, further comprising indicating means, responsive to the difference signal, for providing an indication of any difference between the sense signal and the reference signal.

23. The verification device of claim 21, further comprising first guard means, disposed adjacent to the sensing means, for reducing any stray capacitance in the vicinity of the sensing means.

24. The verification device of claim 23, further comprising means for reducing any stray capacitance between the sensing means and the first guard means.

25. The verification device of claim 24, wherein said means for reducing stray capacitance comprises a transistor, having a base terminal connected to the sensing means, and having an emitter terminal connected to the first guard means.

26. The verification device of claim 25, wherein the transistor comprises voltage means for providing the charge signal as a signal having an electrical voltage characteristic that increases in magnitude as a function of the input impedance of the transistor multiplied by the charge accumulated on the sensing means.

27. The verification device of claim 21, wherein the sensing means is located physically remote from the signal processing means so as to reduce any stray capacitance that may affect the sensing means.

28. The verification device of claim 21, wherein the sensing means is disposed on a first printed circuit board and the signal processing means is disposed on a second printed circuit board that is located physically apart from the first printed circuit board.

29. The verification device of claim 28, further comprising first guard means, disposed adjacent to the sensing means, for reducing any stray capacitance in the vicinity of the corresponding sensing means.

30. The verification device of claim 29, wherein the first printed circuit board further comprises second guard means, electrically connected to the first guard means and disposed within the first printed circuit board below both the sensing means and the first guard means, for reducing any stray capacitance in the vicinity of the sensing means.

31. The verification device of claim 21, wherein the sensing means comprises an electrically-conductive plate having a planar top surface.

32. The verification device of claim 23, wherein the sensing means and the first guard means each comprise an electrically-conductive plate having a planar top surface, the planar surfaces of the sensing means and first guard means being disposed in a planar relationship to one another.

33. The verification device of claim 32, further comprising an electrically conductive reference plate having a planar top surface connected to an electrical reference potential, and disposed adjacent to the first guard means, the planar top surface of the reference plate being disposed in a planar relationship to the planar surfaces of the sensing means and first guard means.

34. The verification device of claim 21, wherein the signal processing means further comprises:
   a. comparator means, for comparing the charge signal with a threshold signal, the threshold signal having a predetermined value indicative of a desired amount of charge, and for providing a binary value signal having a first value indicative of a condition when the actual amount of charge stored by the sensing means as indicated by the charge signal is less than the desired amount of charge indicated by the threshold signal, the binary value signal having a second value indicative of the condition when the actual amount of charge stored by the sensing means as indicated by the charge signal is greater than the desired amount of charge indicated by the threshold signal; and
   b. bistable means, responsive to the binary value signal, for providing the sense signal as a signal having two logic states, a first logic state indicative of the condition when the actual amount of charge stored by the sensing means is less than the desired amount of charge, a second logic state indicative of the condition when the actual amount of charge stored by the sensing means is greater than the desired amount of charge.

35. The verification device of claim 34, wherein the characteristic of the sense signal indicative of the actual amount of charge on the sensing means is an amount of time that the sense signal is at the first logic state of the bistable means.

36. The verification device of claim 21, wherein the charge signal has a value indicative of a finite amount of charge stored on the sensing means during a first predetermined time period; and further comprising discharge means, for reducing to zero the actual amount of charge stored by the sensing means during a second predetermined time period beginning after the end of the first predetermined time period, the charge signal having a corresponding value indicative of the reduction of the actual amount of charge stored by the sensing means during the second predetermined time period.

37. The verification device of claim 36, further comprising oscillator means, for providing a repetitive time-varying signal having binary logic states, for triggering the signal processing means to provide the sense signal with the corresponding characteristic during the first predetermined time period, and for triggering the discharge means to reduce to zero the actual amount of charge stored by the sensing means during the second predetermined time period.

38. The verification device of claim 21, further comprising amplifier means, responsive to the difference signal, having a first input to which a threshold voltage is applied, and having a second input to which is applied a voltage indicative of an amount of time that the value of the difference signal is indicative of any difference between the sense signal and the reference signal, for providing a thread signal indicative of the presence of the security thread within the document paper when the voltage applied to the second input of the amplifier means exceeds the threshold voltage applied to the first input of the amplifier means.

39. A device for verifying the authenticity of a document, an authentic document having a security thread embedded within the document paper and not present on any surface of the paper, at least a portion of the thread being made up of metallic material, the verification device comprising:
   a. at least one sensing channel, each channel disposed in spaced relationship to all other channels, each channel including sensing means for storing a quantity of electrical charge and for providing a charge signal indicative of the actual amount of electrical charge stored by the sensing means, each channel also including corresponding signal processing means, responsive to the charge signal, for providing a sense signal having a characteristic indicative of the actual amount of charge stored by the sensing means;
   b. reference means for providing a reference signal indicative of a predetermined amount of electrical charge; and
   c. means, for comparing each of the sense signals from the corresponding signal processing means with the reference signal to determine any difference between the characteristics of the sense signals indicative of the actual amount of electrical charge stored by each of the sensing means, and for providing a difference signal indicative of the result of the comparison.

40. The verification device of claim 39, further comprising indicating means, responsive to the difference signal, for providing an indication of any difference between the reference signal and each of the corresponding one or more sense signals.

41. The verification device of claim 39, wherein each of the at least one sensing channel further comprises first guard means, disposed adjacent to the corresponding sensing means, for reducing any stray capacitance in the vicinity of the corresponding sensing means.

42. The verification device of claim 41, wherein each of the at least one sensing channel further comprises means for reducing any stray capacitance between the sensing means and the first guard means.

43. The verification device of claim 42, wherein said means for reducing stray capacitance comprises a transistor, having a base terminal connected to the sensing means, and having an emitter terminal connected to the first guard means.

44. The verification device of claim 43, wherein the transistor comprises voltage means for providing the charge signal as a signal having an electrical voltage characteristic that increases in magnitude as a function of the input impedance of the transistor multiplied by the charge accumulated on the sensing means.

* * * * *